United States Patent [19]
Fleetwood

[11] 4,000,670
[45] Jan. 4, 1977

[54] METHOD AND APPARATUS FOR NOISE SUPPRESSION

[75] Inventor: William Fleetwood, St. Helens, England

[73] Assignee: Leesona Plastics Machinery Ltd., Warrington, England

[22] Filed: June 3, 1974

[21] Appl. No.: 476,195

[30] Foreign Application Priority Data

July 10, 1973 United Kingdom ............. 32923/73
Nov. 2, 1973 United Kingdom ............. 51088/73
Feb. 7, 1974 United Kingdom ............... 5586/74

[52] U.S. Cl. .................................... 83/42; 83/169;
83/356.3; 83/701; 181/33 B
[51] Int. Cl.² .......................................... B26D 7/00
[58] Field of Search ............................. 83/98–100,
83/169, 355, 356.3, 42, 701; 181/33 B, 33 C;
241/60, 61, 57

[56] References Cited

UNITED STATES PATENTS

| | | | |
|---|---|---|---|
| 2,297,368 | 9/1942 | Rippl et al. | 83/99 X |
| 2,331,230 | 10/1943 | Rippl et al. | 83/169 |
| 2,347,046 | 4/1944 | Geiger | 83/100 X |
| 2,632,510 | 3/1953 | Doppleb | 83/169 |
| 3,438,295 | 4/1969 | Heinz et al. | 83/349 X |
| 3,651,726 | 3/1972 | Laroche | 83/355 |
| 3,762,256 | 10/1973 | Frantz | 83/356.3 |

FOREIGN PATENTS OR APPLICATIONS 806,470 12/1958 United Kingdom ................... 83/98

*Primary Examiner*—Travis S. McGehee
*Attorney, Agent, or Firm*—Burnett W. Norton

[57] ABSTRACT

Method and apparatus for suppressing noise in machinery a having movable element and fixed element in close proximity to the movable element is disclosed. The movable element and fixed element may coact to disturb the atmosphere and produce noise. A fluid system is provided for inducing a pressure variation proximate to the movable element and fixed element to thereby reduce the level of noise.

19 Claims, 6 Drawing Figures

METHOD AND APPARATUS FOR NOISE SUPPRESSION

BACKGROUND OF THE INVENTION

The present invention relates to rotary machinery and has as an object the reduction of noise in the operation of certain types thereof.

Machines of the kind having a component close to a rotor can be noisy in operation if the arrangement is such that the component and the rotor can act on the atmosphere in the region of the component to disturb said atmosphere and thereby produce noise having fundamental frequency proportional to the rate of rotation of the rotor relative to the component. Such noise, produced by disturbance of the atmosphere, is to be distinguished from noise produced by solid-to-solid impact. It is considered that machines which produce such noise will be readily recognizable by those who have been alerted to the possibility of its occurrence.

SUMMARY OF THE INVENTION

The present invention is based upon the discovery that noise produced as aforesaid may be usefully reduced in many cases by providing a gaseous flow to produce an increased gaseous pressure at that side of the component from which the rotor receeds in its rotation.

Accordingly, the present invention provides a potentially noisy machine having a rotor and at least one component close to the rotor, the form and arrangement of the rotor and said component being such that they can act together on the atmosphere in the region of the component to disturb said atmosphere and thereby produce noise having a fundamental frequency proportional to the rate of rotation of the rotor, relative to said component, said machine being provided with means for providing a gaseous flow to produce, at that side of said component from which the rotor receeds in its rotation, an increased gaseous pressure, so that a substantial diminution of said noise results.

The invention further provides a method of reducing the noise of a machine having at least one component close to the rotor, the form and arrangement of the rotor and said component being such that they can act together on the atmosphere in the region of the component to disturb said atmosphere and thereby produce noise having a fundametal frequency proportional to the rate of rotation of the rotor relative to said component, said method comprising providing a gaseous flow to produce, at that side of said component from which the rotor recedes in its rotation, an increased gaseous pressure, so that a substantial diminution of said noise results.

A principal application of the invention is to machines of the kind in which the said component is a stationary cutting blade and the rotor is generally cylindrical and carries cutting blades mounted with their cutting edges projecting therefrom to be brought in turn into co-operative relationship with the cutting edge of the stationary cutting blade by the rotation of the rotor, and especially so when the cutting blades carried by the rotor and/or the cutting edge of the stationary cutting blade lie(s) generally parallel with the rotational axis of the rotor. Machines with blade arrangements of this kind are used for chopping plastic materials into small pieces suitable for use as raw material in extrusion or injection molding machines.

One example of a machine for this purpose is a pelletizer.

A pelletizer has a single stationary cutting blade with a linear cutting edge and the cutting edges of the blades carried by the rotor are also linear. In use, the pelletizer is fed with extruded strips of the plastic material, usually of circular, rectangular or oval cross section, to cut them into short pellets. A number of strips is fed side by side to make full use of the length of the cutting edges which, for a large machine, may be as much as 32 inches or greater.

A pelletizer running without the strips being fed thereto, and therefore running without engagement of the cutting edges with solid material produces noise of high intensity, attributable to atmospheric disturbance and sounding something like a circular saw cutting timber. Because of this noise, the utility of the machine has in many cases to be restricted, for example by operating it at particular times or at an otherwise unnecessarily low speed.

A preferred arrangement for providing the gaseous flow with a machine according to the invention is a nozzle having an exit arranged to deliver gas towards the component in a direction opposed to the rotational direction of the rotor. Conveniently the nozzle has an elongated delivery aperture the major dimension of which is comparable with the axial length of the rotor.

In one case a pelletizer having a rotor with eight blades of length 6 inches and a cutting circle of 9 inches diameter had to be limited to a speed of 1200 r.p.m. because of the noise problem. When fitted with a nozzle having an elongated delivery aperture as aforesaid supplied by a blower capable of delivering 500 to 600 cu. ft. per minute of air at about 4 inches water gauge and having a butterfly control valve on its output, the atmospheric disturbance noise was so reduced that the machine could be run at 1700 r.p.m. A major proportion of the noise from the machine was then impact noise, including noise produced by the pelletized material striking internal parts of the machine, rather than atmospheric disturbance noise.

On starting up this machine without feeding it with plastic strip material, atmospheric disturbance noise soon became apparent and rose in pitch and intensity as the rotor accelerated. At a stage when conversation at the side of the machine had become very difficult, the blower was brought into operation and the noise was largely eliminated by adjusting the butterfly valve. Indeed, even very quiet conversation was possible. Impact noise was prominently discernible when the quietened machine was fed with plastic strip material, but this was no more than would be tolerable under factory conditions.

The quietening effect was obtainable irrespective of whether the rotor housing was open or closed. Opening the housing with this particular machine was simple as the rotor was driven and carried from one end only. With the housing open, a somewhat similar quietening effect was obtainable by blowing air at the machine from a distance of about 18 inches, with a small hand-held nozzle fed from a compressed air line. The positioning of this nozzle was not critical, and useful results were obtained even when the airstream therefrom was directed to the underside of the stationary blade from an almost end-on position. From these observations it will be apparent that the feasibility of quietening a machine which produces disturbance noise by the application of the present invention is likely to be ascertainable by simple experiment.

In another type of machine to which the invention has been applied, the cutting edge of a stationary cutting blade is regularly serrated and the cutting edges of cutting blades carried by a rotor have projections shaped and positioned to be brought into co-operative relationship with the stationary cutting blade by traversing through the spaces between the projections thereof, the projections of the cutting blades carried by the rotor being so positioned that alternate ones of said spaces are traversed by projections of the cutting blades carried by the rotor before the spaces therebetween are so traversed. A machine of this type, known as a dicer, is used for reducing a plastic sheet feed stock to small pieces of generally uniform size and shape. The sheet stock is given serrated cuts in alternate registrations with the result that it is divided into pieces in which the surface portions of the original stock are rectangular or other rhomboid configuration.

A commercially available dicer of this type produced little disturbance noise when running free, but gave considerable distrubance noise resembling that from a pelletizer, in addition to impact noise, when acting upon feed stock. The disturbance noise was usefully reduced by blowing air using means similar to that fitted to the pelletizer.

BRIEF DESCRIPTION OF THE DRAWING

The following description, in which reference is made to the accompanying drawings, is given in order to illustrate the invention. In the drawings.

DESCRIPTION OF THE PREFERRED EMBODIMENTS

Figure 1:
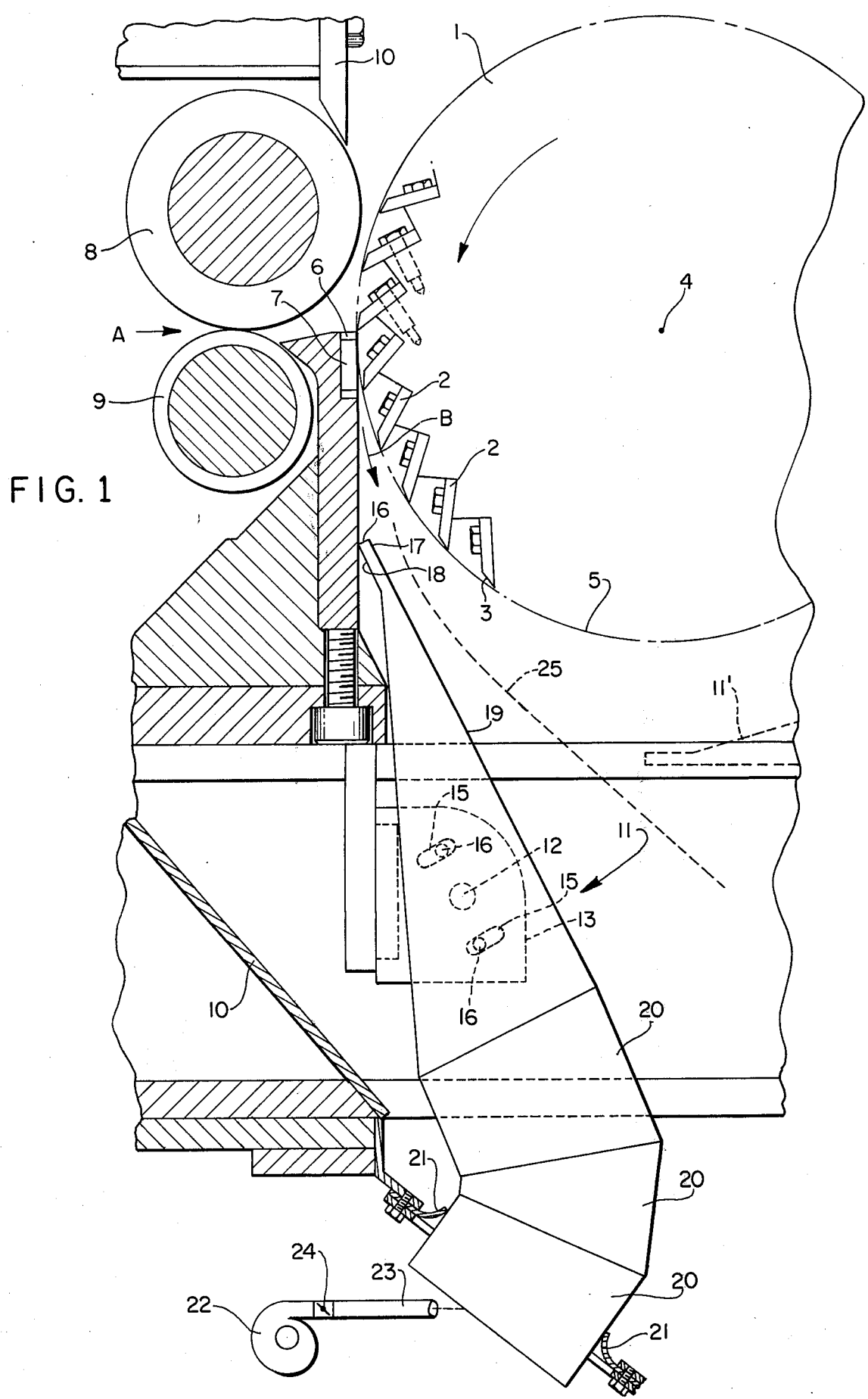
FIG. 1 is a cross section showing the operative parts of a pelletizer equipped according to the present invention.

The pelletizer shown in FIG. 1 has a rotor 1 having 32 straight blades 2 bolted with their linear cutting edges 3 running parallel with the rotational axis 4 of the rotor. The cutting circle 5 is 12 inches in diameter and the length of each cutting edge is 32 inches. Rotation of the rotor 1 brings the cutting edges 3 into close, non-contacting, cutting reltaionship in turn with linear cutting edge 6 of a stationary blade (bed knife) 7, edge 6 also running parallel with axis 4. Feed rolls 8 and 9, pneumatically loaded by means not shown, are provided for feeding extruded plastic strip stock in the direction of arrow A to the upper side of blade 7 for division into short pellets by co-action between the cutting edges of the blades 2 and the blade 7. Arrow B shows the general downward direction in which the pellets are flung by the rotor.

Parts of the rotor housing are shown at 10. As so far described the pelletizer is of known construction. The rotor is driven by a variable speed drive and heretofore the speed has had to be limited, e.g. to 800 r.p.m. because of the disturbance noise generated even when the rotor is run without feeding the stock to be pelletized.

A nozzle 11 pivotally mounted at 12 between brackets 13, only one of which is shown in FIG. 1, is clampable in its angular position by bolts 14 movable in arcuate slots 15 in the brackets. Nozzle 11 has an elongated delivery aperture 16, the major dimension of which is parallel with axis 4 and is substantially equal to the length of the blades 2. Parallel lip sections 17 and 18 of the nozzle communicate via a section 19, which is convergent in one direction and divergent in the other direction, with an inlet section 20 of generally circular cross section which passes through an elastomeric gland 21 to the exterior of the housing, for connection with an air supply in the form of a blower, hose and butterfly valve generally indicated (not to scale) at 22, 34 and 24.

With a blower capable of delivering air at 1000 cu. ft. per minute at about 8 inches water gauge, the disturbance noise of the machine is considerably reduced enabling the rotor to be run at 1000 r.p.m.

With the arrangement described, difficulty can arise from pellets entering the delivery aperture 16 of the nozzle. In a modified arrangement which avoids this difficulty, the nozzle is arranged generally horizontally as indicated at 11' and a curved deflector plate is provided as indicated at 25 to guide the air stream to the underside of the stationary blade 7.

Figure 2:
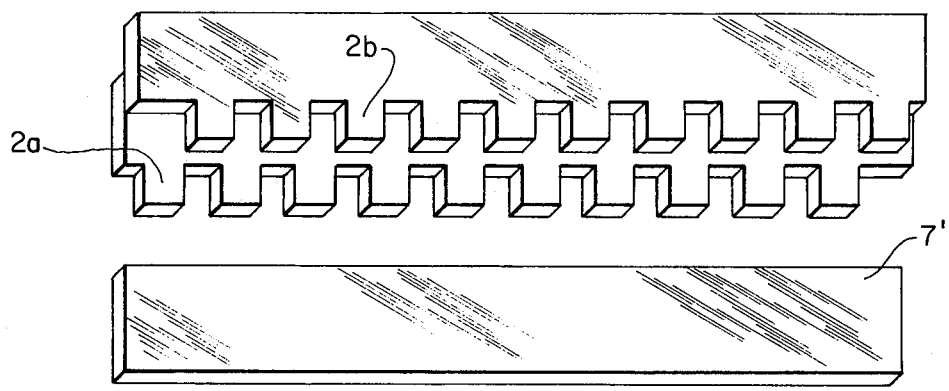
FIGS. 2 and 3 show blade arrangements used in dicing machines.
Figure 3:
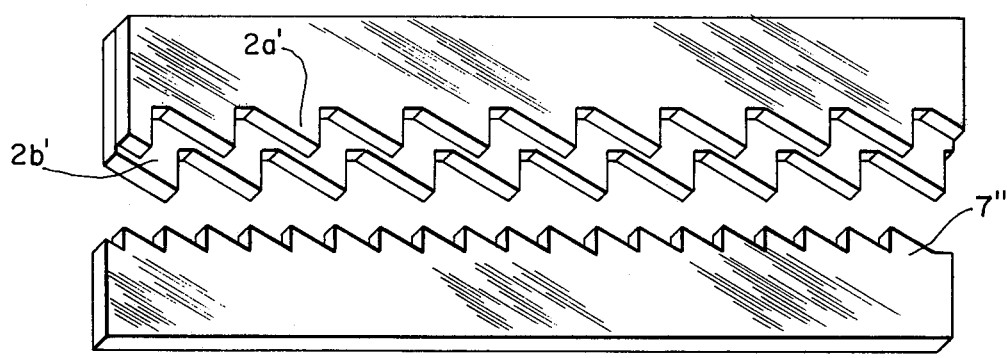

A dicing machine for reducing plastic sheet stock to small pieces of generally uniform size and shape may be provided in similar form to the machine of FIG. 1, but with a modified blade arrangement. The arrangement of FIG. 2 uses a stationary blade (bed knife) 7' with a straight cutting edge and castellated blades 2a and 2b on the rotor, the castellations of any one blade being staggered with respect to those on either side thereof. This machine is suitable for use only with a limited range of feed stocks, e.g., low plasticised polyvinyl chloride. The arrangement of FIG. 3 (rachet tooth dicer) where the stationary blade 7" and the blades 2a' and 2b' of the rotor are serrated and the rotor blades are arranged to traverse only through alternate spaces of the blade 7" at any one time, is suitable for a wider range of feed stocks. The serrations shown in FIG. 3 are asymmetric. In another arrangement (stair step dicer) the serrations are bounded by edges equally and oppositely inclined to the lengths of the knives and substantially perpendicular to one another. A stair step dicer produces pieces which are more nearly cuboidal than does rachet tooth dicer, but requires the feed-stock to be fed in a direction inclined, usually at 45°, to the axis of the rotor. Arranging an air nozzle after the manner described with reference to FIG. 1, effectively diminishes the disturbance noise produced by a dicing machine whilst it is cutting the sheet stock.

Figure 4:
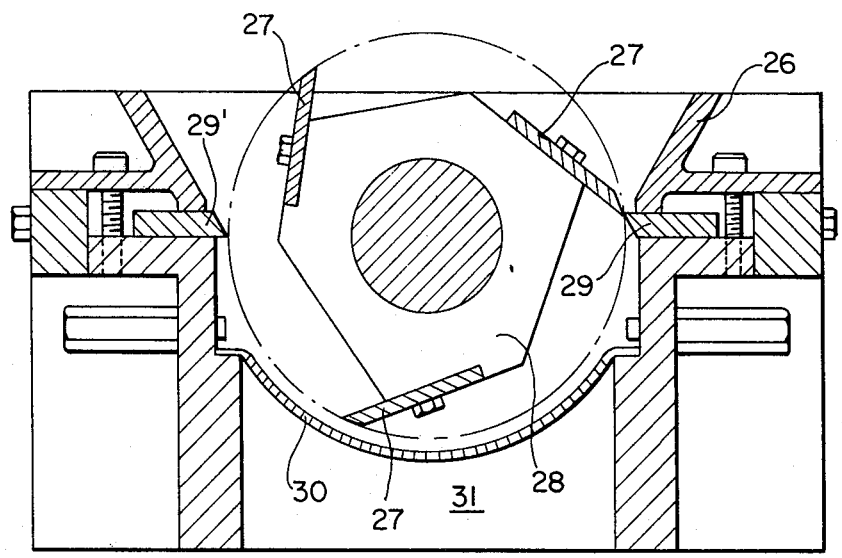
FIG. 4 is a cross section showing the operative parts of a granulating machine.

FIG. 4 is a cross section of part of a granulating machine for reducing plastic material of irregular size and shape to granules, e.g., in the treatment of moulder's rejects or other scrap. The feed is supplied to a hopper above bed knifeguard 26 and is cut by blades 27, carried by a rotor 28, which co-operate with stationary blades 29 and 29'. All the blades have linear cutting edges. Material cut at blade 29' is carried round the inside of a screen 30. The part of the material small enough to pass the screen leaves the machine via chamber 31 and the remainder is re-cycled for further cutting. By arranging a suitable flow of air into the hopper 26, a useful reduction of noise is obtained, even though the effect is much less than with a dicer or pelletizer.

Figure 5:
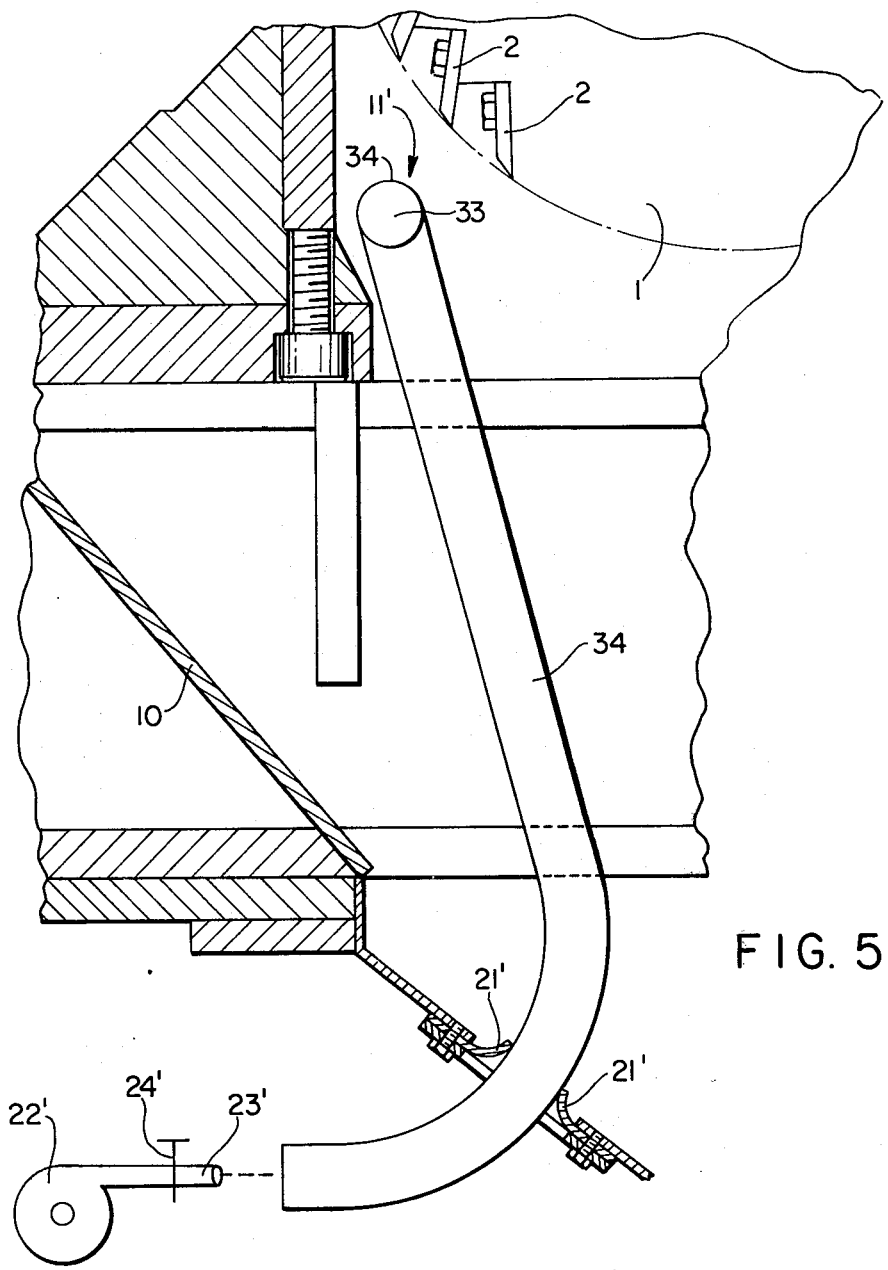
FIG. 5 is a cross section showing part of a pelletizer equipped according to the present invention, with a multiple jet nozzle.
Figure 6:
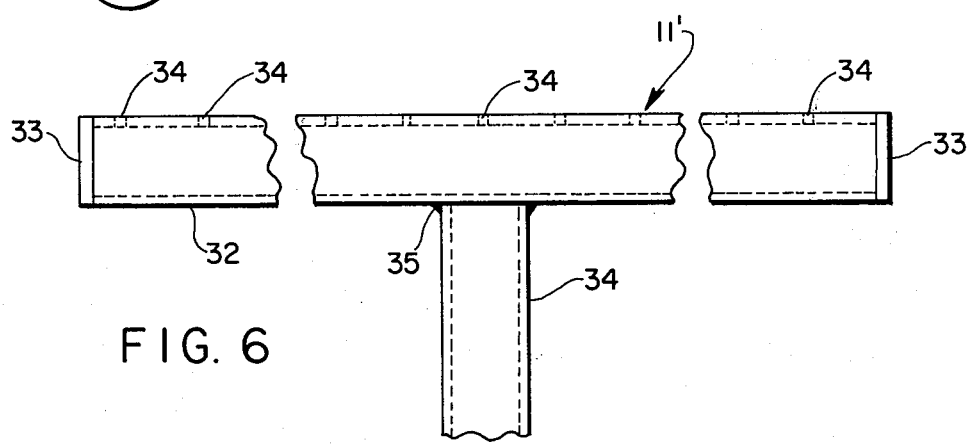
FIG. 6 is an elevation of part of the multiple jet nozzle.

In FIGS. 5 and 6 a further embodiment of the invention is disclosed.

In accordance with the embodiment of FIG. 5 there is provided a rotary machine as aforesaid in which the means for providing the gaseous flow is a set of jets mountable in at least one row extending substantially parallel with the axis of the rotor. The apertures of the jets are preferably of such size that the requisite gaseous flow is obtainable from a compressed air supply such as is commonly installed in factories for general purposes.

The required size and spacing of the jets for a particular machine is determinable by suitable experiment, bearing in mind that decreasing the spacing can reduce their efficacy even though this involves increasing their number. With an effective set of jets the gaseous flow can be adjusted for optimum effect with the machine running. A flow greater than required for the optimum effect may worsen performance.

In practice the jets may be provided in the form of a row of holes in a manifold adapted to be arranged generally parallel with the axis of the rotor and conveniently co-extensive in length therewith. A suitable manifold is readily formed from a simple tube. At the pressures and rates of flow of gas required in practice, no difficulty has been encountered in providing a uniform distribution of gas to and through the holes. Thus, the holes may be of uniform size. A single gas input, to the middle of the manifold is sufficient.

The direction of the jets is preferably arranged to be adjustable so that the optimum direction can be set with the machine running. For this purpose the manifold may be rotatable. As will be shown hereinafter, an adjustable arrangement may be achieved by providing the manifold with a supply tube which is curved and extends to the exterior of the machine.

The pelletizer of FIG. 5 is generally similar to that shown in FIG. 1, identical parts being given the same reference numerals as in said FIG. 1.

A multiple jet nozzle 11' extends parallel with the axis of the rotor 1 over the full width of the machine. Nozzle 11' is formed of a tube 32 of internal diameter 0.5 inch, the ends of which are closed by end plates 33 welded in position. Radial holes 34 of 1/32 inch diameter are drilled at intervals of 1 inch along a straight line parallel with the axis of tube 32. Rotor 1 has blades 2 which are 32 inches in length. The first and last of the holes 33 are registered with the ends of the blades 1 and there are 33 holes in all.

Tube 32 is supplied with compressed air from a compressor 22' via a line 23' equipped with a manually operable control valve 24', items 22, 23' and 24' being indicated conventionally in FIG. 5. Line 23' connects with a tube 34 of 0.5 inch internal diameter welded in communicating relationship at 35 with the middle of tube 32 opposite the line of holes 34. As shown in FIG. 5, tube 34 is curved within the pelletizer before passing outwardly through gland 21'. The arrangement allows the tube 32 to be adjusted in its position, especially to adjust the direction of the holes 34.

By adjusting the tube 32 and the valve 24' to optimum settings, effective suppression of disturbance noise is obtained. The air-flow required per hole is of the order of 0.5 cubic feet per minute (total 16.5 cubic feet per minute for the 33 holes) using an air supply of nominally 30 pounds per square inch pressure. It is to be noted that supplying the air at a rate beyond the optimum tends to increase the noise.

Using a similar arragement, but with larger holes (0.040 inch diameter instead of 1/32 inch), the following results were obtained.

| Rotor Speed RPM | Noise Level[a] Without Air Supply | Noise Level With Adjusted Air[a] Supply | |
|---|---|---|---|
| | | Without Covers[c] | With Covers[b] |
| 400 | 89 | 72(73) | — |
| 500 | 93 | 75(78) | 73 |
| 600 | 96 | 77(79) | 75 |
| 700 | 97 | 81(85) | 78 |
| 800 | 103 | 86(90) | 82 |
| 900 | 106 | 89(92) | 84 |
| 1000 | 109 | 91(93) | 85 |

[a]The figures for noise level were measured at a fixed position near the machine using a meter calibrated on a decibel scale and are relative rather than absolute. [b]The covers were the normal removable covers of the machine.
[c]The figures in brackets were taken after further 0.04 inch holes had been drilled between the original holes to give a center-to-center spacing of 0.5 inch.

It will be understood that the foregoing description of the effects obtainable by the application of the invention to granulators, pelletizers and dicing machines is given by way of illustration only. Other applications of the invention will be apparent to those skilled in the art. Included within the scope of the invention is a method of producing a substantially silenced machine from a series of machines of different types, each machine having at least one component close to a rotor, the form and arrangement of the rotor and said component being such that they can act together on the atmosphere in the region of the component to produce disturbance noise of the kind hereinbefore described, said method comprising providing machines of the series with a gaseous flow to produce an increased gaseous pressure at that side of said component from which the rotor recedesin its rotation, and selecting from the series of machines a machine for which the gaseous flow provides a substantial reduction of said noise.

What is claimed is:

1. Apparatus comprising, movable means, second means arranged in close proximity to said movable means, said movable means and said second means coacting to disturb the atmosphere and produce noise, said second means defining an approaching zone for said movable means and a receding zone fro said movable means, and means for creating in said receding zone a localized substantially continuous positive pressure greater than the pressure in said approaching zone to thereby reduce the level of said noise.

2. Apparatus as set forth in claim 1 wherein said means for creating said localized substantially continuous positive pressure is operable to create a positive fluid pressure at a substantially even pressure.

3. Apparatus as set forth in claim 1 wherein said movable means is rotary means, and said second means is non-rotating means.

4. Apparatus as set forth in claim 1 including means for driving said movable means, said pressure creating means being operable to maintain in said receding zone said localized substantially continuous pressure as said driving means is operated to drive said movable means.

5. Apparatus as set forth in claim 3 wherein said rotary means is a rotor having a plurality of cutting edges therein, and the noise produced is a function of the number of said cutting edges and the rotational rate of said rotary means.

6. Apparatus as set forth in claim 5 wherein said rotor rotates about an axis and said cutting edges are arranged generally parallel with said axis.

7. Apparatus as set forth in claim 5 wherein said rotor comprises a generally cylindrical member and said cutting edges project from said member.

8. Apparatus as set forth in claim 5 wherein said non-rotating means is a stationary member having a straight cutting edge thereon, and the cutting edges of said rotor are straight.

9. Apparatus as set forth in claim 5 wherein said non-rotating means is a stationary member having a straight cutting edge thereon, and the cutting edges of said rotor are serrated.

10. Apparatus as set forth in claim 5 wherein said non-rotating means is a stationary member having a serrated cutting edges thereon, the cutting edges of said rotor being serrated and being positioned to be brought into cooperative relationship with said cutting edges of said stationary member during rotation of said rotor.

11. Apparatus as set forth in claim 1 including advancing means for presenting material to said movable means and said second means for treatment thereby.

12. Apparatus as set forth in claim 3 wherein said pressure directing means includes a nozzle having aperture means the major dimension of which is generally coextensive with the length of said rotary means.

13. Apparatus as set forth in claim 1 wherein said pressure directing means includes a set of jets.

14. Apparatus as set forth in claim 13 wherein said jets are formed as a row of holes in a manifold, said manifold being generally coextensive in length with the length of said rotary means.

15. Apparatus as set forth in claim 5 wherein said rotor rotates about the axis and said cutting edges are inclined with respect to said axis.

16. A method for reducing the noise level in apparatus having movable means and second means arranged in close proximity to said movable means with said second means defining an approaching zone for said movable means and a receding zone for said movable means wherein the movable means and second means coact to produce noise, comprising the steps of, driving said movable means, and directing a substantially continuous positive pressure proximate to said receding zone and said movable means to thereby reduce the level of said noise.

17. A method as set forth in claim 16 wherein the step of directing said pressure includes directing a positive fluid pressure at a substantially even pressure.

18. A method as set forth in claim 16 wherein said movable means is rotary means and said second means is non-rotating means.

19. A method as set forth in claim 18 including the step of forming said zone of positive pressure along substantially the entire length of said rotary means.

* * * * *